United States Patent [19]

Gaiser

[11] Patent Number: 4,615,419
[45] Date of Patent: Oct. 7, 1986

[54] TORQUE SENSING BRAKING CONTROLLER FOR BRAKES

[75] Inventor: Robert F. Gaiser, Stevensville, Mich.

[73] Assignee: Allied Corporation, Morristown, N.J.

[21] Appl. No.: 716,053

[22] Filed: Mar. 26, 1985

[51] Int. Cl.[4] .............................................. B60T 8/12
[52] U.S. Cl. .................................. 188/181 T; 303/112
[58] Field of Search ..................... 188/181 T; 303/112

[56] References Cited

U.S. PATENT DOCUMENTS

| | | | |
|---|---|---|---|
| 2,243,449 | 5/1941 | Aikman | 303/112 |
| 3,349,875 | 10/1967 | Stelzer | 303/112 X |
| 3,369,635 | 2/1968 | Davis | 303/112 X |
| 3,754,794 | 8/1973 | Durand | 188/181 R X |
| 4,099,792 | 7/1978 | Schmid et al. | 188/181 T X |
| 4,129,202 | 12/1978 | Winters et al. | 188/181 T |

FOREIGN PATENT DOCUMENTS 1528450 10/1978 United Kingdom ............ 188/181 T

Primary Examiner—George E. A. Halvosa
Attorney, Agent, or Firm—Larry J. Palguta; Ken C. Decker

[57] ABSTRACT

A torque sensing braking controller senses directly the braking torque exerted by a rotating element (14, 114, 214, 314) upon at least one friction element (20, 222, 320 and 332) of the brake (10, 210, 310), such that the sudden decrease in torque which occurs when wheel lockup and skidding occurs is sensed and results in the communication of an increased output pressure to oppose outward displacement of at least one differential area piston (40 and 50, 240 and 250, 340) by fluid pressure received from the master cylinder, the increased output pressure causing the piston to reduce braking force exerted by the friction element against the rotating element (14, 114, 214, 314) so that the rotating element may recommence rotation. The torque sensing braking controller may be utilized in drum brake (10), duo-servo drum brake (210), and disc brake (310) assemblies. In each instance, the brake utilizes the sudden drop in braking torque to create an increased output pressure which opposes displacement of a differential area piston and effects release of the rotatable element so that wheel rotation recommences.

36 Claims, 9 Drawing Figures

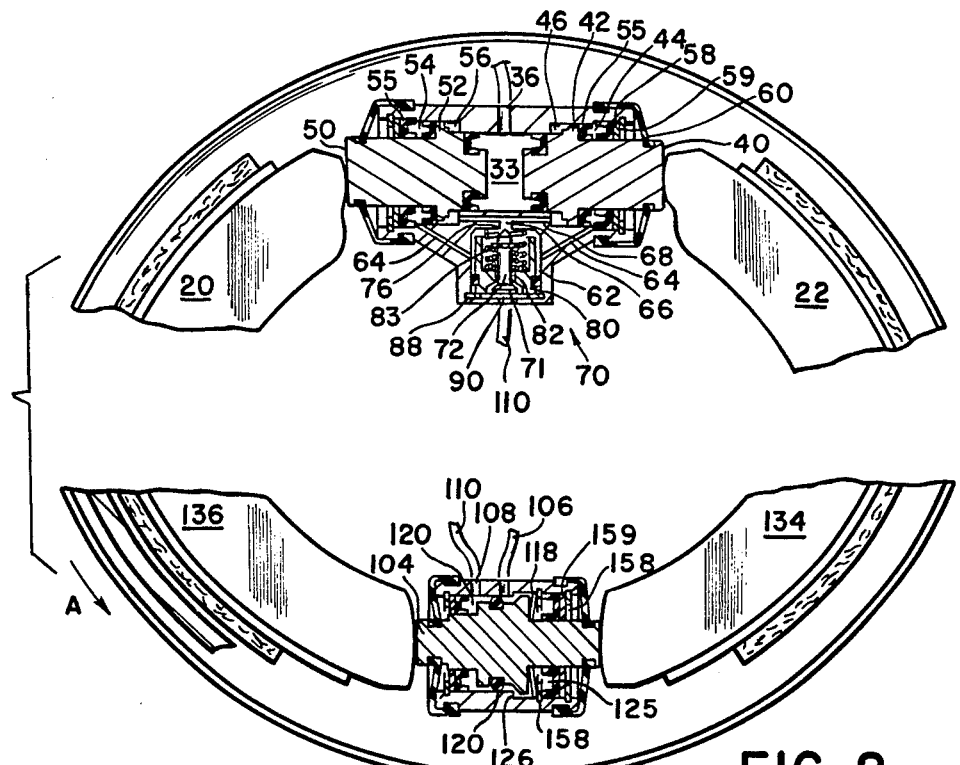
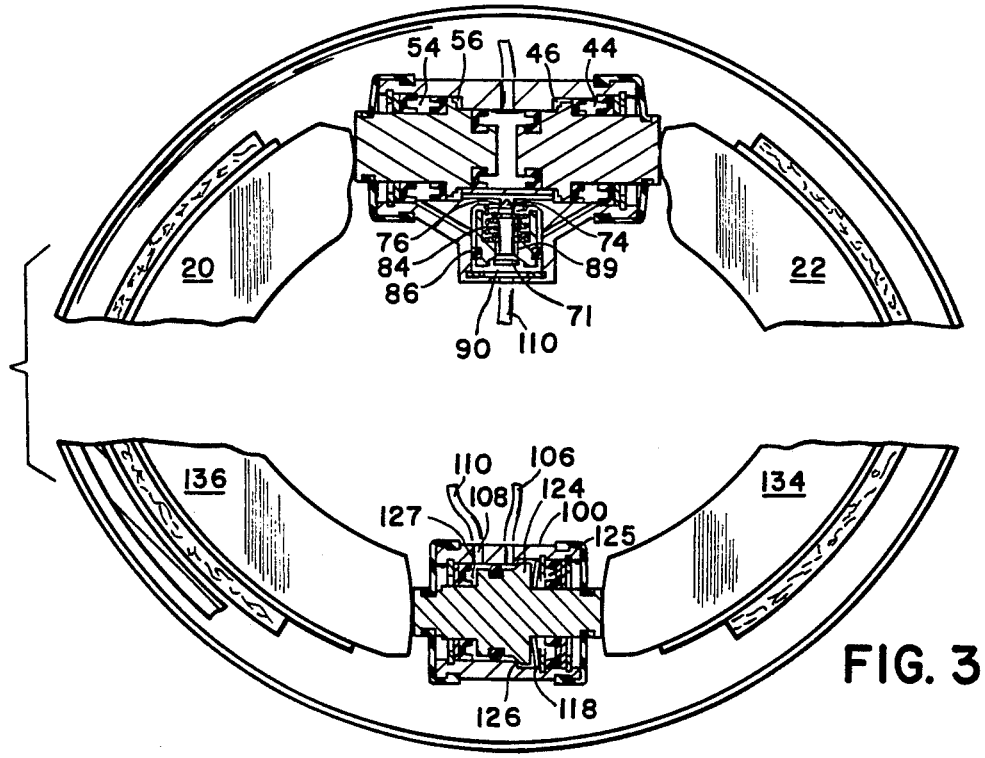
FIG. 2
FIG. 3

TORQUE SENSING BRAKING CONTROLLER FOR BRAKES

This invention relates to a torque sensing braking controller for brakes, specifically for drum brakes, duo-servo drum brakes and disc brakes.

In vehicle braking systems, a rotatable element is attached to a vehicle wheel and engaged by a pair of friction elements that are biased into engagement by at least one piston. In drum brakes, typically a pair of brake shoes are biased radially outwardly into engagement with a rotating drum, and in a disc brake a single or dual pistons bias a friction pad into engagement with the rotor and reaction forces cause the caliper to be displaced and engage an outer friction pad with the other side of the rotor. At times, application of the brakes by the vehicle operator results in a lockup of the wheel brakes whereby the wheels cause rotation and begin skidding upon the road surface. It is desirable to provide a braking system wherein the occurrence of skidding is detected and which results in the immediate release of a skidding wheel for further rotation and braking application, without having to provide a complex and expensive anti-skid braking system. The prior art has proposed the sensing of braking torque in order to effect various results, including increasing the initial braking pressure so that a power booster is not required. Bauman U.S. Pat. No. 3,268,038 issued Aug. 23, 1966, discloses a differential area wheel cylinder which utilizes braking torque to multiply the force exerted by the brake actuator on the brake shoes, so that a power booster is no longer required and anti-skid is provided. Stelzer U.S. Pat. No. 3,349,875 issued on Oct. 31, 1967, discloses a servo drum brake which utilizes braking torque transmitted by the trailing shoe to a valve in the wheel cylinder housing in order to communicate further fluid pressure to the braking actuator effecting separation of the brake shoes. Each of the above-described patents utilizes the braking torque to cause an increase or boost in the pressure communicated from the vehicle master cylinder to the brake actuator, in order to further increase the forces exerted against the brake shoes. In these devices, the sudden decrease in braking torque occurring when the wheel begins to skid results in the communication of back pressure to the master cylinder and the vehicle brake, causing the brake pedal to return and move against the operator's foot. It is desirable to provide a torque sensing braking controller which senses the true wheel torque so that the sudden decrease in braking torque that occurs when the wheel ceases rotation during skidding, is utilized to decrease the forces exerted by the brake actuator on the friction elements so that the rotatable element is released for further rotation. It is desirable that the fluid pressure received from the brake master cylinder exerts force upon the friction elements independently of any pressure received from the torque sensing device, and the pressure received from the torque sensing device be utilized to reduce the forces on the brake shoes without communicating any objectionable or undue back pressure to the master cylinder and vehicle brake pedal.

The present invention comprises a torque sensing brake controller for non-servo drum brakes, servo drum brakes, and disc brakes. The drum brake torque sensing brake controller comprises a wheel cylinder piston having two differential area pistons biased outwardly by pressurized fluid received from the vehicle master cylinder, with a spool valve disposed between the opposite ends of the brake shoes. Each differential piston has an enlarged diameter portion received within an enlarged diameter bore section of the wheel cylinder housing, the enlarged diameter portion and enlarged diameter bore section forming first and second chambers disposed on opposite sides of the enlarged diameter portion. The spool valve is anchored to a non-rotatable portion of the vehicle, and receives pressurized fluid from the master cylinder in addition to having the ends of the spool valve engaged by associated ends of the brake shoes. There is at least one poppet valve associated with the pistons in the wheel cylinder housing, such that the poppet valve allows fluid flow between opposite sides of enlarged diameter portions of the differential area pistons. The communication of pressurized fluid from the vehicle master cylinder causes the differential pistons to be biased outwardly to bias the upper ends of the brake shoes into engagement with the rotating drum, the bottom ends of the drum brake shoes engaging the spool valve and the leading shoe effecting an initial movement of the spool valve in one direction. When the brake locks up and skidding occurs, the braking torque exerted by the leading shoe against the spool valve drops suddenly by a substantial magnitude, such that the spool valve moves in the opposite direction and effects a pressure output to the wheel cylinder. The output pressure causes the poppet valve to close to prevent any further transfer of fluid between the first and second chambers of the respective pistons and permit the output pressure to be communicated only to the respective first chambers so that the output pressure opposes directly the outward displacement of the pistons by the pressure communicated from the master cylinder. The increase in pressure in the first chambers decreases the forces exerted by the differential area pistons upon the brake shoes such that the brake shoes release the drum for rotation.

The duo-servo drum brake includes a pair of brake shoes connected at one end by a wheel cylinder housing having a stepped bore receiving therein a pair of differential area pistons. The differential area pistons each have an enlarged diameter portion received within an enlarged diameter section of the bore such that first and second chambers are formed on opposite sides of the enlarged diameter portions of the pistons. The wheel cylinder housing has a second bore housing first valve means which communicates with the first and second chambers of each of the pistons to permit fluid transfer therebetween as the pistons are displaced outwardly by pressurized fluid received from the master cylinder, and a third bore receiving a control piston biased outwardly by a resilient spring into engagement with an end of the trailing brake shoe. The opposite end of the pair of brake shoes includes an adjustment mechanism for adjusting the radial position of the brake shoes in accordance with brake lining wear. Pressurized fluid from the master cylinder is received in a chamber between the differential area pistons to cause outward expansion of the pistons operatively coupled to the leading and trailing brake shoes and effect engagement of each shoe with the rotating drum. The pressurized fluid received from the master cylinder displaces the pistons independently of any output pressure from the control piston. The slight rotation of the shoes causes by their engagement with the rotating drum causes the upper end of the trailing shoe to be biased against the control piston, the third bore of the control piston having a spring biasing the control piston in the opposite direction and assisted by pressurized fluid received from the master cylinder. During outward expansion of the wheel cylinder pistons, the first valve means permits brake fluid contained within the respective first chambers to be transmitted to the respective second chambers so that no forces are exerted upon the pistons. When the vehicle brake locks up and skidding occurs, there is a sudden drop in the braking torque exerted by the upper end of the trailing shoe against the control piston, and the control piston is displaced outwardly to effect an output pressure that is communicated to the first valve means to cause closure thereof and prevent further transfer of fluid between the respective first and second chambers. The output pressure is communicated to each of the first chambers so that the pressure in the first chambers is increased and opposes outward expansion of the pistons by the pressurized fluid receive from the master cylinder. The output pressure biases the pistons inwardly and reduces the forces exerted upon the brake shoes such that the drum is released for rotation of the wheel.

The torque sensing braking controller for a disc brake comprises an assembly contained completely within the caliper of the disc brake assembly. The disc brake assembly comprises a caliper housing having a stepped bore therein receiving a differential area piston having an enlarged diameter portion received within an enlarged diameter section of the bore. Pressurized fluid from the master cylinder is received in a reduced diameter section of the bore in order to apply the piston against a friction element positioned adjacent the rotating rotor, the caliper extending over the rotor to engage an outer friction element and reaction forces causing displacement of the caliper to bias the outer friction element against the other side of the rotor. The enlarged diameter portion of the piston and enlarged diameter section of the bore define first and second chambers disposed on opposite sides of the enlarged diameter portion. Each chamber communicates via a passage with a third bore containing a poppet valve, the poppet valve having a channel for communicating with a control piston contained within a second bore disposed in the caliper. The poppet valve includes a movable seat which moves within the third bore so that when the poppet valve closes, output pressure from the control piston is communicated to the first chamber. The control piston receives pressurized fluid from the master cylinder and extends outwardly of the second bore to engage a connection member bridging across the rotor and connected to each of the friction elements. Pressurized fluid from the brake master cylinder biases the differential area piston outwardly independently of any output pressure from the control piston. The differential area piston engages the associated friction element to bias it into frictional engagement with the rotor, reaction forces causing the caliper to slide on the support member and cause the other friction element to frictionally engage the other side of the rotor. The braking torque causes the friction elements to be displaced circumferentially such that the connection member biases the control piston inwardly of the second bore. When rotation of the rotor ceases and skidding occurs, the sudden decrease in braking torque permits the control piston to extend outwardly of the second bore, so that the control piston creates an output pressure which is communicated to the poppet valve. The poppet valve closes to prevent fluid transfer between the first and second chambers, but the movable seat permits the output pressure to be communicated to the first chamber to oppose outward movement of the differential area piston. The output pressure reduces the forces exerted by the friction pads so that the rotor is released for rotation and skidding ceases.

The torque sensing braking controller of the present invention provides substantial advantages over previous devices. The controller senses the true wheel torque and utilizes the sudden drop in wheel torque that accompanies wheel lockup to oppose directly outward displacement of the piston or pistons operating the friction elements. By opposing directly the fluid pressure received from the master cylinder, the controller enables both the release of the rotating element so that skidding ceases and communication through the master cylinder of only a slight back pressure to the vehicle brake pedal so that the vehicle operator feels only an acceptable level of back pressure. Unlike prior art devices which permit the back pressure to be communicated directly to the master cylinder line so that the back pressure moves the brake pedal suddenly upwardly against the operator's foot, the present device insulates the output pressure created by the sudden drop in braking torque from any direct communication to the brake line communicating with the master cylinder. Thus, there is effected a release of the wheels so that the vehicle wheels again rotate and skidding ceases, without any sudden backward movement of the brake pedal. Additionally, the present invention overcomes the various problems associated with height variations of the vehicle, load variation of the vehicle, leaf spring sag, brake shoe fade, deceleration, and change in the coefficient of friction of the road surface. This is accomplished with only a slight change in standard brake equipment, the basic equipment being retained but modified. Finally, the anti-skid effects of the present invention are accomplished without expensive and complex anti-skid braking systems often utilized in the prior art.

The present invention can now be explained with reference to the accompanying drawings wherein:

FIG. 2 is a partial view of the wheel cylinder and spool valve of the non-servo drum brake during braking operation;

FIG. 3 is a partial view of the wheel cylinder and spool valve of FIG. 1 during operation at wheel lockup and release;

Figure 1:
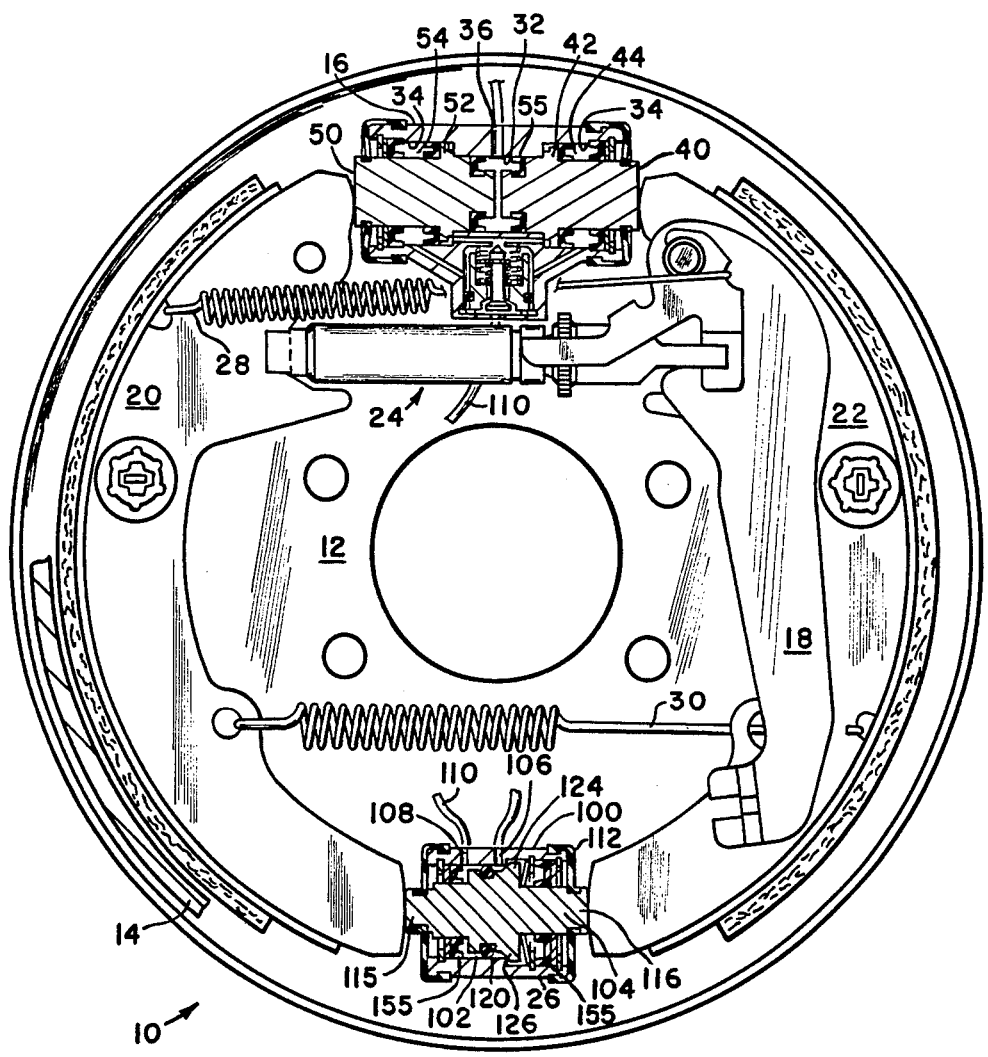
FIG. 1 illustrates the present invention utilized in a non-servo drum brake.

FIG. 1 illustrates a non-servo drum brake including the torque sensing brake controller of the present invention. The non-servo drum brake is designated generally by reference numeral 10 and comprises a backing plate 12 fixedly mounted to a non-rotatable portion of the vehicle (not shown), a rotating drum 14 (partially shown) rotatably attached to a wheel (not shown), a wheel cylinder housing 16, brake shoes 20 and 22, parking brake lever 18, brake shoe wear adjusting mechanism 24, torque sensing valve 26, and springs 28 and 30. The springs 28 and 30 bias shoes 20 and 22 radially inwardly against the adjusting mechanism 24. Although the adjusting mechanism 24 and parking brake lever 18 are illustrated herein, it should be clearly understood that neither of these components form a part of the present invention, and any other similar devices may or may not be utilized with the drum brakes disclosed herein. The wheel cylinder housing 16 receives pressurized fluid from the master cylinder of the vehicle, to apply the brake shoes into frictional engagement with the rotating drum so that rotation of the drum is retarded. Upon completion of braking application, springs 28 and 30 return the brake shoes to their illustrated at-rest position. Referring to the illustrations of FIGS. 1–3, the wheel cylinder housing 16 includes a stepped bore 32 including enlarged diameter sections 34. Inlet 36 provides for communication of pressurized fluid from the master cylinder of the vehicle to the chamber 33 of bore 32 to effect outward displacement of the differential area pistons 40 and 50. Differential area pistons 40 and 50 each include an enlarged diameter portion 42, 52, respectively, which define with the enlarged diameter sections 34 first chambers 44 and 54 and second chambers 46 and 56. Annular cup-shaped seals 55 are disposed about appropriate portions o differential area pistons 40 and 50 in order to effect sealing engagement with stepped bore 32. The axially outer seals 55 are held in position by circlips 58 and rings 59, the pistons each receiving a boot seal 60 which engages a respective end of wheel cylinder housing 16. Wheel cylinder housing 16 includes a chamber 62 receiving therein a poppet valve designated generally by reference numeral 70. Chamber 62 communicates with channels 64 that communicate with the respective first chambers 44 and 54, and inlet opening 66 communicates with channel 68 that communicates with both second chambers 46, 56. The poppet valve 70 includes a poppet 72 having an end 74 positioned adjacent valve seat 76, poppet 72 being received within opening 82 of movable seat 80. Movable seat 80 is baised away from housing 16 by spring 83, and poppet 72 is biased by spring 84 toward seat 76. Lip seal 86 is disposed about movable seat 80 which is retained within chamber 62 by ring 88 fixed to housing 16 at opening 90. The differential area pistons 40 and 50 each engage a respective brake shoe 22, 20.

Torque-sensing valve 26 comprises a housing 100 fixed to backing plate 12, with a stepped bore 102 receiving therein the spool valve 104. Housing 100 includes opening 106 for receiving pressurized fluid communicated from the master cylinder to stepped bore 102, and outlet opening 108 which permits an outlet pressure to be communicated via hose 110 to opening 90 of wheel cylinder housing 16. Housing 100 has boots 112 at each end thereof enclosing the ends of the housing and mating with grooves contained on spool valve ends 115 and 116. Spool valve ends 115 and 116 each engage an end of respective brake shoe. Seals 155 are disposed about spool valve 104 and maintained in position by circlips 158 and rings 159. A spring 118, such as Belleville washer, engages a circlip 158 disposed in housing 100, and biases spool valve 104 in a leftward direction. Ring seal 120 is disposed about the midportion of spool valve 104. The spool valve 104 includes an enlarged diameter portion 124 which engages a shoulder 126 of housing 100.

The torque sensing braking controller of the present invention senses the actual braking torque forces exerted by at least one of the brake shoes during wheel rotation, and senses a change in torque by means of spool valve 104 which is biased, by spring 118 and fluid pressure received from the master cylinder, in a direction of the leading shoe 20. The spool valve 104 transmits the change in braking torque in the form of a fluid pressure output which opposes the outward displacement of pistons 40 and 50, and thereby reduces the forces exerted upon the upper ends of brake shoes 20 and 22. The reduction in braking forces on the shoes reduces the braking force exerted by the shoes upon the rotating drum to allow the wheels to recommence rotation. The present invention depends upon wheel locking or skidding for a short duration to effect an intermittent lock-release-lock-release, etc., of the wheel. Thus, total skidding by the automobile is eliminated and the vehicle operator is able to maintain steering and braking application without sending the vehicle into a full skid. The occurrence of wheel lock or skidding is not required or necessary for normally controlled stops. In normally controlled stops, there is no sudden reduction in torque to be transmitted by the spool valve, and therefore, no output pressure communicated to the wheel cylinder.

Non-servo drum brake 10 with the torque sensing braking controller of the present invention operates as follows during braking application. When the vehicle is not moving, pressurized fluid communicated from the vehicle's master cylinder (not shown) to chamber 33 displaces pistons 40, 50 outwardly against brake shoes 20, 22. The areas of the enlarged diameter portions 42, 52 facing each of the first 44, 54 and second 46, 56 chambers is equal so that as the pistons are displaced outwardly against the brake shoes, brake fluid transfers from the first chambers 44, 54 through channels 64, chamber 62, opening 66, channel 68 to second chambers 46, 56. Thus, the transfer of fluid between the first chambers and second chambers does not exert any force against the pistons being displaced by the fluid pressure communicated to chamber 33. While the vehicle is stationary, the force exerted by the spring 118 in spool valve housing 100 is approximately equal to the fluid pressure transmitted from the master cylinder through opening 106 to chamber 102, so that the shoe forces at the spool valve 104 are equal, and the shoes are forced outwardly by pistons 40, 50 into contact with the drum. When the vehicle is travelling forward and the brakes are applied, pressurized fluid communicated to chamber 33 displaces the differential pistons 40, 50 outwardly to cause the brake shoes to engage the drum (the drum rotating in the direction of arrow A, FIG. 2), and causes end 136 of shoe 20 to exert braking torque against spool valve 104. This causes, at a predetermined force level, spool valve 104 to move to the right in FIG. 2, the separation of enlarged diameter portion 124 from shoulder 126 allowing pressurized fluid from the master cylinder to enter chamber 125. The movement of spool valve 104 to the right is slight, but is predetermined in order to obtain the desired output pressure from chamber 127 when wheel lock occurs. When the brake shoes 20, 22 have engaged the drum and caused the drum to stop spinning, i.e. wheel lock, skidding of the vehicle occurs and the braking torque forces are converted to skidding energy so that the torque exerted by shoe end 136 drops suddenly and substantially and the force applied by shoe end 134 to valve 104 increases simultaneously. It has been found that the sudden decrease in torque at wheel lockup or skidding is substantial and occurs as fast as 1/100th of a second. This sudden decrease in braking torque results in spool valve 104 moving to the left (see FIG. 3) under the combined force of the spring 118 and pressurized fluid received from the master cylinder, the pressurized fluid acting on enlarged diameter portion 124. This causes a pressurization of fluid in chamber 127 to effect an output pressure through opening 108 and hose 110 to opening 90. The output pressure from spool valve 104 causes movable seat 80 to be displaced upwardly (FIG. 3) such that poppet end 74 closes seat 76 to prevent further fluid transfer between the first and second chambers, and the movement of poppet head 71 away from slots or clearance 89 in seat 80 permit the output pressure to be communicated to chamber 62 and channels 64 to first chambers 44, 54 wherein fluid pressure in the chambers is increased. The increased fluid pressure in chambers 44, 54 is exerted against the enlarged diameter portions 42, 52 to bias the differential area pistons 44, 50 inwardly in direct opposition to the pressurized fluid received from the master cylinder, and thus causes a reduction in the braking forces exerted against the brake shoes 20, 22 such that the brake shoes release the drum for rotation which terminates the brief skidding that occurred at wheel lock. The drum rotation again produces an increase in braking torque transmitted through shoe end 136 to the spool valve 104 to cause displacement of spool valve 104 to the right which decreases the output pressure from chamber 127 and thus results in a decrease in the fluid pressures in first chambers 44, 54 to permit a greater braking force to be exerted by differential pistons 40, 50 on the shoes. When the brake shoes again cause the braking torque to equal the torque of the wheel whereby the wheel locks or stops spinning and skidding commences, there will be again an immediate drop in the braking torque transmitted by shoe 136 to spool valve 104, with a resultant output pressure from chamber 127 being communicated to first chambers 44, 54. The cycle repeats until vehicle movement ceases or until the pressure from the vehicle's master cylinder is reduced to a pressure where the braking torque is less than the wheel torque. Thus, there is effected a series of short duration lock-release-lock-release cycles of the wheel so that uncontrolled or extended skidding is averted and effective braking and steering are maintained by the vehicle driver during deceleration.

When the vehicle is moving backwards, the shoe 22 becomes the leading shoe during brake application and braking torque is transmitted by shoe end 134 to spool valve 104, with the torque exerted through shoe end 136 being much smaller in magnitude, whereby spool valve 104 is biased continuously to the left and enlarged diameter portion 124 remains in contact with shoulder 126 and there is no output pressure effected through outlet 108. As a result, full braking pressure is communicated to the differential area pistons 40 and 50, and with no increase in pressure in first chambers 44, 54, a full braking application is always effected during reverse movement of the vehicle. Thus, there is always full pressure communicated by the wheel cylinder to the brake shoes for braking during reverse movement.

Figure 4:
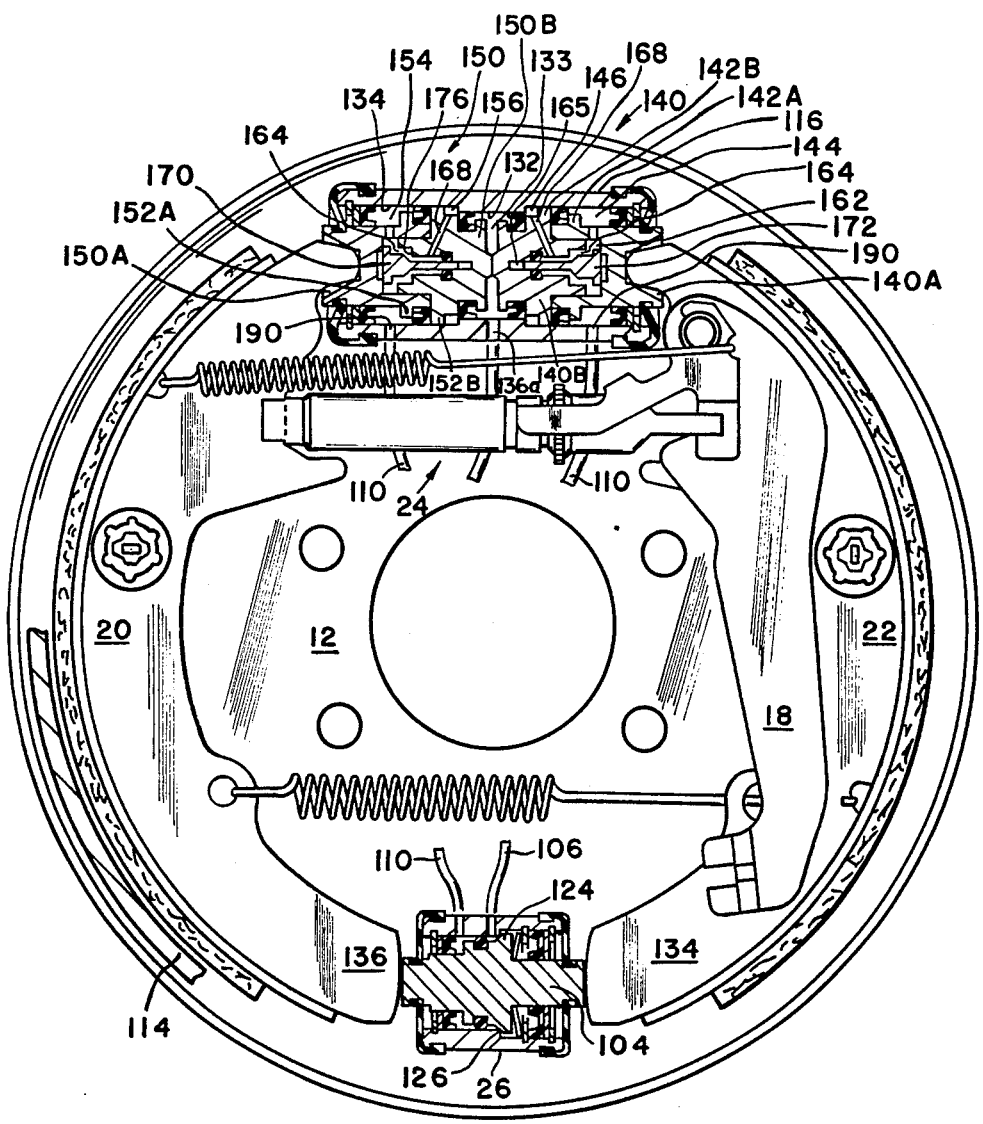
FIG. 4 illustrates an alternative embodiment of the wheel cylinder utilized in a non-servo drum brake.

FIG. 4 illustrates an alternative embodiment of the wheel cylinder housing. Wheel cylinder housing 116 is disposed between adjacent ends of brake shoes 20, 22 and the spool valve 104 is disposed between the opposite adjacent ends of the shoes. Wheel cylinder housing 116 includes a stepped bore 132 having disposed therein differential area pistons 140 and 150. Each differential area piston 140, 150 comprises two components 140a, 140b and 150a, 150b, respectively. The components include enlarged diameter sections 142a, 142b, 152a, 152b received within an associated enlarged diameter section 134. Disposed within each differential area piston 140, 150 is an interior chamber 162 containing a poppet 172 of poppet valve 170 which can engage seat 176 to control fluid flow between channels 164 and 168 as the pistons are displaced outwardly by increased brake fluid pressure received from the master cylinder and transmitted through opening 136a to chamber 133. The wheel cylinder 116 operates with spool valve 104 of torque sensing valve 26, in the same manner as previously explained for wheel cylinder 16. Fluid pressure communicated from the vehicle master cylinder to chamber 133 displaces the differential area pistons 140, 150 outwardly to bias the brake shoes 22, 20 into engagement with the rotating drum. As the pressurized brake fluid from the master cylinder displaces the differential pistons 140, 150 outwardly, fluid from the first chambers 144, 154 is transmitted to the respective second chambers 146, 156. Braking torque is transmitted by shoe end 136 to the spool valve 104 previously illustrated, and when there is wheel lockup and skidding occurs, the sudden decrease in brake torque transmitted by leading shoe 20 against spool valve 104 results in an output pressure being transmitted by spool valve 104 to inlets 190. The outlet pressure from spool valve 104 causes an increase in pressures in first chambers 144, 154 to act against the enlarged head portion of each poppet 172 adjacent respective pistons 140,150 via aperture means (not shown) to cause poppets 172 to move axially inwardly against seats 176 to prevent any further fluid transfer between first chambers 144, 154 and second chambers 146, 156, respectively. The output pressure causes the increase in pressures in the first chambers and opposes outward displacement of the pistons. This causes a reduction in the braking forces exerted by pistons 140, 150 upon brake shoes 22, 20 and release the drum for the recommencement of rotation. As can be seen, the operation of wheel cylinder housing 116 is identical to the operation of wheel cylinder housing 16, except that wheel cylinder housing 116 contains two poppet valves 170 disposed between the two components comprising each piston. The cavities 165 in pistons 140, 150 are vented to atmosphere so that poppets 172 may be displaced axially by an output pressure received from spool valve 104.

Figure 5:
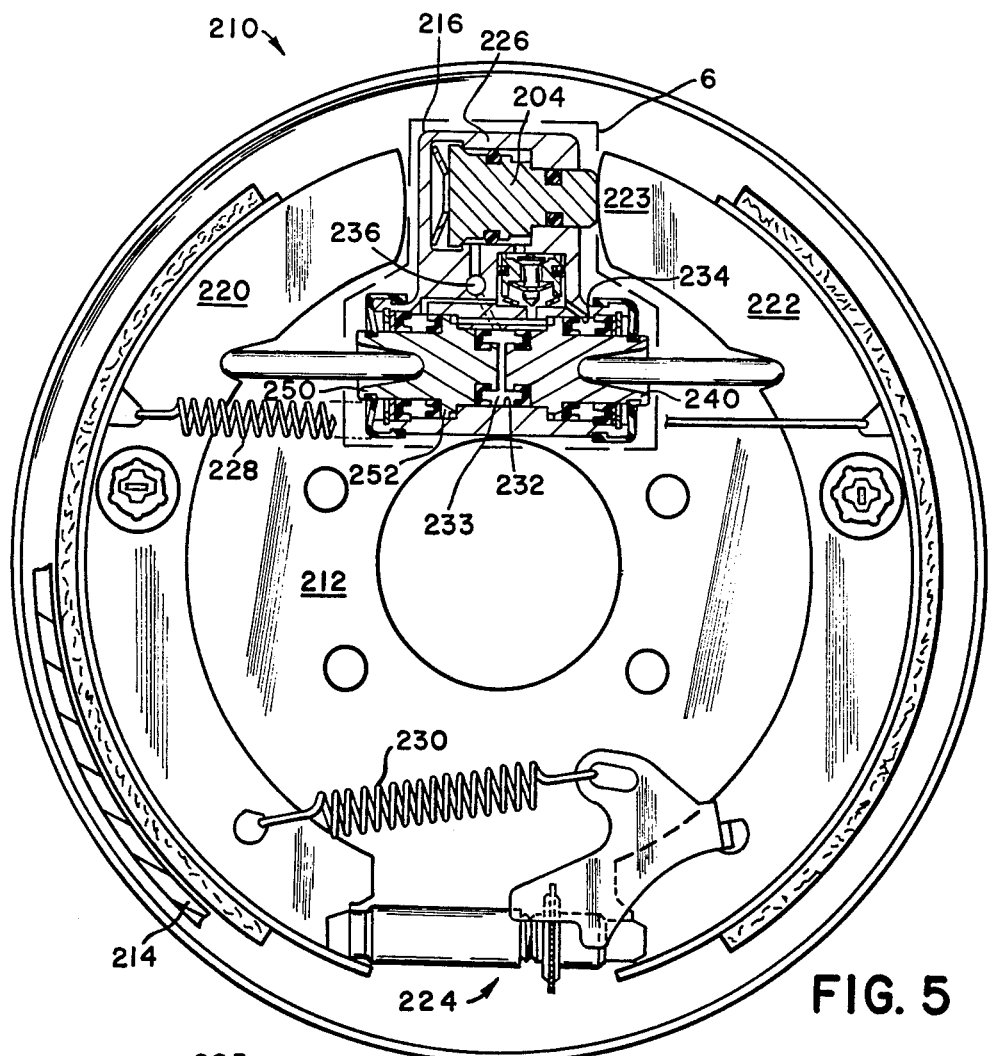
FIG. 5 illustrates the present invention utilized in a duo-servo drum brake.
Figure 6:
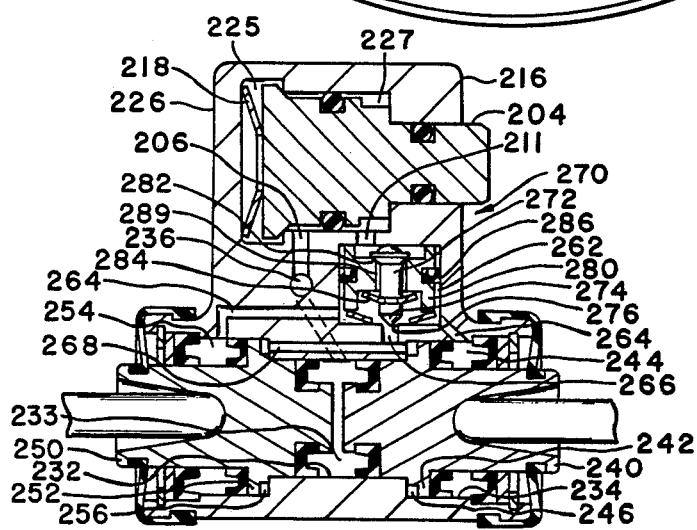
FIG. 6 is an enlarged view of the wheel cylinder utilized in a duo-servo drum brake.

Referring now to FIGS. 5 and 6, there is illustrated a duo-servo drum brake with the torque sensing braking controller of the present invention. Similar or like structures are designated by numerals increased by 100. Duo-servo drum brake 210 includes a pair of brake shoes 220, 222 positioned for engagement with a rotatable drum 214 (partially shown), a brake lining wear adjuster 224 (cable attachment not shown), and return springs 228, 230. Brake lining wear adjuster 224 does not form a part of the present invention. The wheel cylinder housing 216 includes therein a pair of differential area pistons 240, 250 disposed within a stepped bore 232.

The differential area pistons 240, 250 and stepped bore 232 define a chamber 233 which receives pressurized fluid from the vehicle master cylinder (not shown) via the inlet opening 236. Each differential area piston 240, 250 has an enlarged diameter portion 242, 252 which defines with enlarged diameter sections 234 first chambers 244, 254 and second chambers 246, 256, respectively. The first and second chambers are each in communication with one another via the channels 264 which emanate from chamber 262 that houses a poppet valve 270. Poppet valve 270 includes a poppet 272 biased by a spring 284 toward the valve seat 276, the poppet 272 closing the seat 282 within the movable seat 280. A lip seal 286 circumposes the perimeter of movable seat 280. Fluid is communicated to the respective second chambers 246, 256 by the inlet opening 266 and channel 268. The chamber 262 is connected by passageway 211 to the torque sensing valve 226 which includes a control valve 204. Control valve 204 is baised to the right by Belleville spring 218 so that it engages directly the end 223 of shoe 222. The torque sensing braking controller for the duo-servo drum brake 210 operates in the same manner as described for the above non-servo drum brake 10. When fluid pressure is received from the master cylinder via inlet 236, the pressure increase in chamber 233 displaces the differential area pistons 240, 250 outwardly to force the shoes 220, 222 into engagement with the rotating drum 214. The brake fluid in first chambers 244, 254 is displaced via channels 264, chamber 262, seat 276, inlet opening 266, and channel 268 to respective second chambers 246, 256. The seat 282 of poppet valve 270 is held closed as the braking torque of trailing shoe 222 acts upon the valve 226 to bias control valve 204 inwardly against spring 218. Slight fluid leakage may occur around lip seal 286 in order to replenish fluid in chamber 227. Fluid pressure from the vehicle master cylinder is communicated via opening 206 to valve 226 wherein control valve 204 moves initially to the left under forces exerted by shoe end 223 and the fluid pressure, so that the fluid pressure is communicated to chamber 225. As described previously for the non-servo drum brake, the braking torque is transmitted through trailing shoe 222 to control valve 204 to bias the control valve inwardly against the combined forces of spring 218 and the pressurized fluid in chamber 225. When the wheel torque equals drum torque, that is, the wheel locks up and skidding begins, there is a sudden drop in the braking torque exerted by shoe end 223 against control valve 204. This permits valve 204 to move to the right as a result of the combined spring force and the pressurized fluid in chamber 225, to create a pressure increase within chamber 227 and emit a pressure output through passageway 211 to valve 270. This causes movable seat 280 to move downwardly so that poppet end 274 closes valve seat 276 to prevent any further fluid transfer between the first and second chambers of the respective differential area pistons, and as the movable seat 280 moves downwardly the valve seat 282 opens to permit the output pressure from chamber 227 to be communicated via slots or clearance 289, chamber 262 and channels 264 to the first chambers 244 and 254. The fluid pressure within first chambers 244, 254 exerts forces on the enlarged diameter portions 242, 252 of the differential area pistons, which forces are in direct opposition to the forces exerted by the pressurized fluid received from the master cylinder. This prevents any further outward expansion of the differential area pistons and results in a decrease in the resultant forces exerted on brake shoes 220, 222 so that the drum recommences rotation. As described above, when the wheel recommences rotation, there will again be an increase in braking torque communicated by shoe end 223 to control torque sensing valve 226 which causes valve 204 to move to the left and decrease the output pressure communicated to the first chambers. The pressures in first chambers 244, 254 are decreased as fluid moves backwardly through chamber 262 to chamber 227, resulting in an outward displacement of the differential area pistons 240, 250 as a result of the fluid pressure in chamber 233 exerting a greater force against the pistons than the fluid pressure in the first chambers. There is the intermittent lock-release-lock-release of the wheel which prevents continued skidding of the vehicle wheel and provides for a controlled stopping of the vehicle, all without communicating any undesirable backward movement of the brake pedal against the foot of the vehicle operator. The vehicle operator will sense a slight back pressure from the brake pedal, but not an objectionable amount such as would cause an inappropriate or panic response by the vehicle operator. If the vehicle operator should respond by increasing the pressure applied to the brake pedal during braking, the communication of increased fluid pressure from the master cylinder to the brakes does not result in increased braking pressures and complete wheel lockup because increased fluid pressure results in a higher output pressure from chamber 227 to the first chambers of the wheel cylinder housing 216. In other words, the increased pressure received from the vehicle master cylinder results only in an equalization of pressures on both sides of the enlarged diameter sections 242, 252 of the respective differential area pistons. This results in a negligible increase of braking pressure on the differential area pistons.

Figure 7:
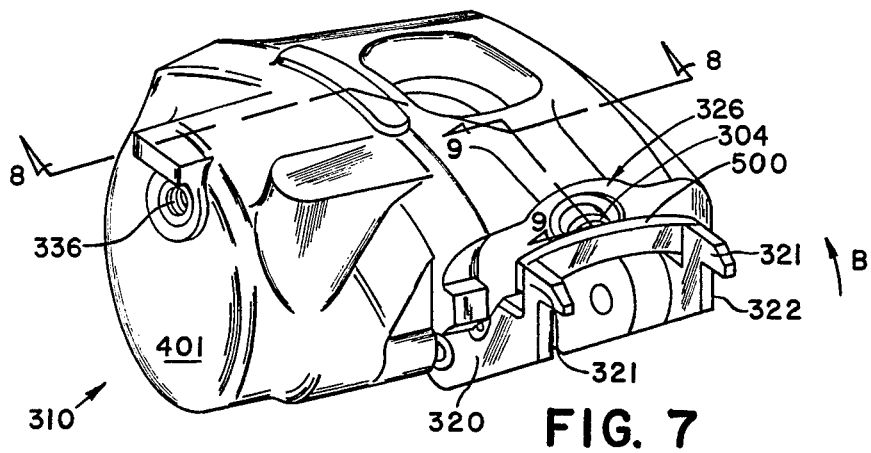
FIG. 7 is a perspective view of a disc brake utilizing the torque sensing braking controller of the present invention.
Figure 9:
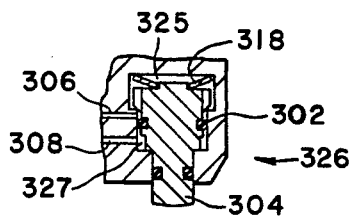
FIG. 9 is a section view along view line 9—9 of FIG. 8.
Figure 8:
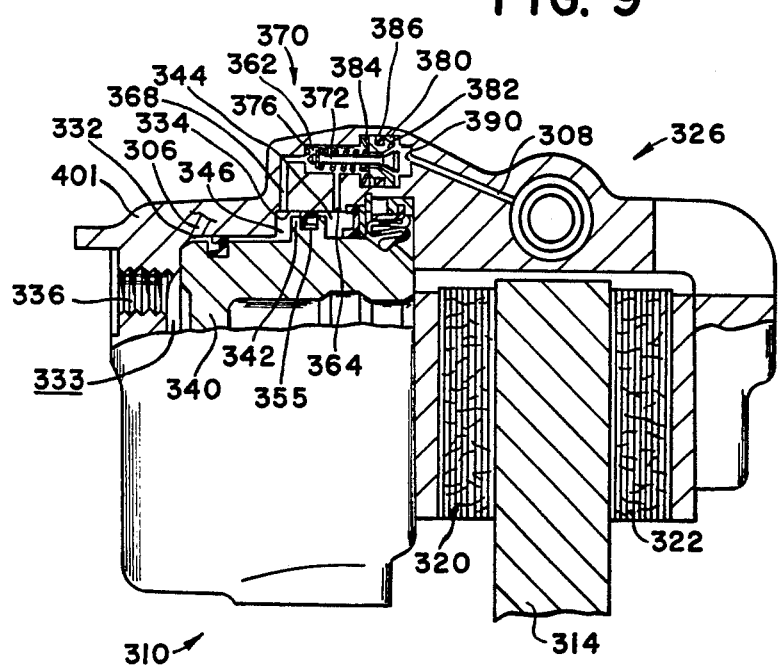
FIG. 8 is a section view along view line 8—8 of FIG. 7.

Referring to FIGS. 7 and 8, there is illustrated a disc brake 310 having the torque sensing braking controller of the present invention incorporated therein. FIG. 7 is a perspective view of the caliper 401 and brake pads 320, 322, the caliper and shoes slidably positioned upon a support plate (not shown). The brake pads 320, 322 have corners 321 forming a seat or retainer for the connecting member 500 which engages the control valve 304 of torque sensing valve 326. FIG. 8 is an end section view of the caliper 401 and FIG. 9 is a top section view illustrating the valve 326. Caliper 401 includes a stepped bore 332 having therein a differential area piston 340 with enlarged diameter portion 342 received in the enlarged diameter section 334. The piston 340 and stepped bore 332 define a pressure chamber 333 communicating by inlet 336 with pressurized fluid received from the vehicle master cylinder (not shown). The enlarged diameter portion 342 defines with stepped bore 332 the first 344 and second 346 chambers. The piston 340 may be displaced outwardly against the inner brake pad 320 and rotor 314, the reaction forces, as is well known in the art, causing the caliper to be slidably displaced on the torque support member (not shown) and displacing the outer brake pad 322 into frictional engagement with the other side of rotor 314. Caliper 401 includes a chamber 362 having a poppet valve 370 disposed therein, fluid pressure from torque sensing valve 326 being communicated via passageway 308 (see FIG. 9) to chamber 362. Poppet valve 370 includes a seat 376 which may be closed by poppet 372 received within movable seat 380. Seat 382 is closed by poppet 372, but lip seal ring 386 disposed about movable seat 380 will permit a small amount of brake fluid to pass therearound through opening 390 to passageway 308. Chamber 302 of valve 326 includes a control valve 304 biased outwardly by a spring 318 and pressurized brake fluid in chamber 325 is received from the vehicle master cylinder via opening 306. Passageway 308 permits a slight back flow of brake fluid from chamber 362 when the valve 304 is displaced inwardly against the spring 318 and pressurized brake fluid within chamber 325.

The torque sensing braking controller of the disk brake 310 operates in the same manner described for the previous embodiments, including braking during reverse operation of the vehicle. When pressurized fluid from the vehicle master cylinder is communicated through opening 336 to chamber 333, the piston 340 is displaced to the right of FIG. 8 to bias brake pad 320 into engagement with rotor 314, and the caliper is displaced by reaction forces so that brake pad 322 frictionally engages rotating rotor 314. Brake fluid in first chamber 344 is transferred to second chamber 346 via channel 364, chamber 362, and channel 368 as the piston moves outwardly, so that no resultant force is exerted against the piston as it is displaced against pad 320. The first and second chambers have equal areas so that no pressure changes occur. As the brake pads engage rotating rotor 314 and retard rotation thereof, the pads are moved circumferentially in the direction of Arrow B of FIG. 7 so that connecting member 500 presses control valve 304 inwardly of chamber 302. Control valve 304 is displaced against spring 318 and pressurized fluid in chamber 325, so that as the valve 304 moves inwardly the fluid volume of chamber 327 increases with slight fluid compensation provided as previously described via opening 390 and passageway 308. When the wheel torque equals the braking torque i.e., wheel lock occurs and skidding begins, the braking torque exerted by the brake pads on connecting member 500 decreases immediately so that the combined forces of the pressurized fluid in chamber 325 and spring 318 displace control valve 304 outwardly against the member 500. This causes an increase in pressure in chamber 327 and transmits an output pressure through passageway 308 and opening 390 to chamber 362. The outlet pressure causes displacement of movable seat 380 and poppet 372 closes seat 376 to prevent any further fluid transfer between the first and second chambers 344, 354. The movable seat 380 is displaced towards the seat 376 to open the valve seat 382 so that the output pressure from chamber 327 is communicated via channel 364 to first chamber 344. The output pressure communicated to first chamber 344 opposes directly the outward movement of differential area piston 340 and causes a decrease in the compressive forces exerted by the piston and caliper against brake pads 320 and 322, whereby rotor 314 is released for rotation. There is an intermittent rotation of rotor 314, identical to the above-described intermittent rotation of the drums and wheels of the servo and nonservo drum brakes 10 and 210. When there is a decrease in the fluid pressure received from the vehicle master cylinder (a normal brake release), piston 340 returns leftward so that fluid in second chamber 346 flows around lip seal 355 into first chamber 344. The main fluid volume displacement between second chamber 346 and first chamber 344 is via lip seal 355. The spring 384 forces movable seat 380 and poppet 372 to the right to open seat 376 so that further fluid displacement may occur via channel 368, chamber 362 and channel 364.

Although the present invention has been illustrated and described in connection with example embodiments, it will be understood that this is illustrative of the invention, and is by no means restrictive, thereof. It is reasonably to be expected that those skilled in the art can make numerous revisions and additions to the invention and it is intended that such revisions and additions will be included in the scope of the following claims as equivalents of the invention.

I claim:

1. A torque sensing braking controller for permitting a wheel to recommence rotation when vehicle wheel rotation has ceased, the braking controller comprising a pair of friction elements for frictionally engaging and retarding rotation of a rotating element operatively connected to the vehicle wheel, at least one differential area piston means disposed in a bore of a piston housing and operable responsively to pressurized fluid which causes said piston means to move at least one of said friction elements into engagement with said rotating element, the differential area piston means, piston housing and bore defining first and second chambers sealingly separated from one another, first valve means having a valve operatively coupled to at least one of said friction elements and including an inlet chamber receiving said pressurized fluid and a separate outlet chamber for communicating fluid pressure to said first chamber, and second valve means communicating with said first and second chambers, said second valve means permitting fluid displacement between said first and second chambers when the fluid pressure from said first valve means is below a predetermined level, the pressurized fluid effecting displacement of said piston means and one friction element to retard rotation of said rotating element and effect fluid displacement between said first and second chambers, the pressurized fluid effecting displacement of said piston to effect engagement of said friction element with the rotating element independently of any fluid pressure from said first valve means, and pressurized fluid and braking torque from said friction element causing said valve of the first valve means to be displaced in an initial direction such that said outlet chamber is enlarged, and a sudden decrease in braking torque caused by the cessation of wheel rotation permitting said valve to be displaced in an opposite direction to reduce the size of said outlet chamber and cause a fluid pressure output which is communicated to said second valve means to effect closure of said second valve means such that the fluid pressure output is communicated only to said first chamber to oppose the displacement of said piston means by said pressurized fluid and thereby effect rotational release of said rotating element.

2. The torque sensing braking controller in accordance with claim 1, wherein said second valve means comprises a poppet valve responsive to a predetermined level of fluid pressure received from the outlet chamber of said first valve means such that the poppet valve closes to prevent further fluid transfer between the first and second chambers.

3. The torque sensing braking controller in accordance with claim 1, wherein the operative connection of the valve with the friction element includes resilient means which biases said valve into engagement with said friction element, such that braking torque is transmitted by said friction element to said valve.

4. The torque sensing braking controller in accordance with claim 3, wherein said braking controller comprises a disc brake with said piston means engaging a friction element to bias it into frictional engagement with said rotating element which comprises a rotor, the piston housing comprising a caliper which extends over said rotor to operatively engage a second one of said friction elements and bias the second friction element into frictional engagement with said rotor when said caliper is displaced in response to the communication of pressurized fluid to the bore.

5. The torque sensing braking controller in accordance with claim 4, wherein said valve is disposed within a second bore in the caliper and extends outwardly of said second bore for engagement with connecting means operatively attached to at least one of the friction elements, braking torque causing said one friction element to be displaced circumferentially relative to the disc and bias said connecting means against said valve.

6. The torque sensing braking controller in accordance with claim 5, wherein said connecting means comprises a pad plate extending over said rotor and engaging arms extending from said friction elements.

7. The torque sensing braking controller in accordance with claim 6, wherein said second valve means is disposed within said caliper and includes a movable seat enclosing one end of said poppet valve, the communication of the fluid pressure output from said first valve means causing displacement of said movable seat such that the poppet valve is permitted to close and prevent communication between said first and second chambers and the movable seat permitting the fluid pressure output to be communicated to said first chamber to oppose the displacement of said piston means so that said rotor is released to recommence rotation.

8. The torque sensing braking controller in accordance with claim 7, wherein an enlarged diameter portion of said piston means includes a cup seal which, when the communication of pressurized fluid ceases, permits the flow of fluid from said second chamber to said first chamber.

9. The torque sensing braking controller in accordance with claim 8, wherein said movable seat incluudes a lip seal disposed thereabout so that when the communication of pressurized fluid ceases, the lip seal prmits leakage of fluid toward said first valve means.

10. The torque sensing braking controller in accordance with claim 1, further comprising an opening disposed within said differential area piston means and said second valve disposed within said opening.

11. The torque sensing braking controller in accordance with claim 1, wherein the pressurized fluid is communicated to said first valve means to effect biasing of said valve into operative engagement with said friction element.

12. The torque sensing braking controller in accordance with claim 1, wherein said piston housing comprises the wheel cylinder of a drum brake and the piston means comprises two differential area pistons disposed within the bore with pressurized fluid communicated to an area between said pistons in order to displace said pistons outwardly against respective friction elements.

13. The torque sensing braking controller in accordance with claim 12, wherein said second valve means comprises a poppet valve disposed within an opening of each of said pistons, the poppet valves permitting fluid communication between the first chambers and second chambers disposed on opposite sides of enlarged diameter portions of said differential area pistons.

14. The torque sensing braking controller in accordance with claim 13, wherein said poppet valves operate responsively to a predetermined level of fluid pressure received from said first valve means to effect closing of the poppet valves and prevent transfer of fluid between said first and second chambers.

15. The torque sensing braking controller in accordance with claim 13, wherein said first valve means comprises a differential area piston device biased by spring mean into engagement with a friction element, the pressurized fluid assisting said spring to bias said piston device into said engagement with said friction element.

16. The torque sensing braking controller in accordance with claim 14, wherein said differential area piston device is engaged at each end by a respective friction element, and braking torque causing displacement of said device.

17. The torque sensing braking controller in accordance with claim 12, wherein said drum brake comprises a servo drum brake and said first valve means is disposed within a housing portion integral with said wheel cylinder, said first valve means engaged by a brake shoe of said servo drum brake.

18. The torque sensing braking controller in accordance with claim 17, wherein said second valve means comprises a poppet valve communicating with said first valve means and with said first and second chambers which are formed in said wheel cylinder, fluid pressure received from said first valve means effecting closure of said poppet valve to prevent transfer of fluid between said first and second chambers in the wheel cylinder.

19. The torque sensing braking controller in accordance with claim 18, wherein said two differential area pistons are disposed back-to-back and are displaced outwardly by pressurized fluid against brake shoes to bias the brake shoes into engagement with the rotating element, each of the pistons having a respective first and second chamber with displacement of the respective pistons causing fluid to be communicated via the poppet valve from the first chambers to the second chambers.

20. The torque sensing braking controller in accordance with claim 19, wherein the sudden decrease in braking torque exerted against said first valve means permits the valve of said first valve means to be displaced and effect the communication of said fluid pressure output to each of said first chambers to effectively oppose outward displacement of said pistons so that said rotatable element is released for rotation, the poppet valve closed by said fluid pressure output and preventing the transfer of fluid between the first and second chambers.

21. A torque sensing braking controller for a drum brake, comprising a wheel cylinder housing fixedly mounted between adjacent ends of a pair of brake shoes and including two differential area pistons each having an enlarged diameter portion and operatively engaging an associated brake shoe, both pistons disposed within a bore of the wheel cylinder housing such that the enlarged diameter portions of the respective pistons and housing define first and second chambers each disposed on opposite sides of the enlarged diameter portions of the respective pistons, each piston having an interior opening receiving first valve means therein, communication passages between each of said first and second chambers with the interior opening disposed between the passages, resilient means between said brake shoes for biasing said brake shoes radially inwardly, and second valve means disposed between opposite adjacent ends of said brake shoes, the second valve means comprising a differential area piston device having opposite ends operatively engaged by respective ends of said shoes, the second valve means communicating with each of the first chambers in said wheel cylinder housing, communication of pressurized fluid to the second valve means and wheel cylinder housing effecting outward displacement of said differential area pistons to engage the brake shoes with the drum and retard rotation thereof, the outward displacement of said pistons causing the transfer of fluid from said first chambers to said second chambers and the pressurized fluid effecting outward displacement of the pistons independently of any output pressure from the second valve means, a sudden decrease in braking torque caused by cessation of drum rotation causing displacement of said piston device and the communication of an output pressure to each of the first chambers of said wheel cylinder housing to effect closure of said first valve means and increase the pressure in the first chambers to oppose the outward displacement of said pistons by said pressurized fluid, the increase of the pressure in the first chambers decreasing the force exerted by the pistons against the respective brake shoes such that the rotating drum is released for rotation.

22. The torque sensing braking controller in accordance with claim 21, wherein the differential area piston device comprises a single valve member disposed within a bore of a fixedly positioned housing and biased in one direction by resilient means, a composite force from the pressurized fluid and braking torque from one of said brake shoes effecting an initial displacement of the single valve member against the resilient means.

23. The torque sensing braking controller in accordance with claim 22, wherein the sudden decrease in braking torque exerted by said one brake shoe against said single valve member permits said single valve member to be displaced in the opposite direction and cause the output pressure to be communicated to said first chambers.

24. The torque sensing braking controller in accordance with claim 23, further comprising brake shoe adjustment means disposed between the brake shoes and operatively adjusting an inactive position of the brake shoes in response to wear of brake linings on said brake shoes.

25. The torque sensing braking controller in accordance with claim 24, further comprising a parking brake lever operatively connected to one of said brake shoes and engaging said adjustment mechanism, whereby movement of said lever causes expansion of brake shoes and engagement with said drum.

26. A torque sensing braking controller for a servo brake, comprising a pair of brake shoes carrying friction elements thereon and adapted to be driven into frictional engagement with a rotating drum disposed thereabout, a wheel cylinder housing disposed between adjacent ends of said brake shoes and including in a bore therein a pair of wheel cylinder pistons with a pressure chamber therebetween communicating with a master cylinder of the vehicle and each wheel cylinder piston operatively engaging one of said brake shoes, the wheel cylinder pistons comprising differential area pistons each having an enlarged diameter portion received within an enlarged diameter section of said bore, the enlarged diameter portion of each piston defining with the enlarged diameter section a first and second chamber disposed on opposite sides of the enlarged diameter portion, the wheel housing further including a second bore having a control piston therein and receiving pressurized fluid from said master cylinder, the control piston biased by spring means and operatively engaging one of said brake shoes, the second bore communicating with a third bore containing valve means therein, the valve means communicating with the first and second chambers of the wheel cylinder housing to permit transfer of fluid therebetween when the respective pistons are displaced, the communication of pressurized fluid from said master cylinder to the pressure chamber effecting outward displacement of said pistons to effect engagement of the friction elements with the rotating drum such that braking torque is transmitted by one of said brake shoes to said control piston, the pressurized fluid from the master cylinder expanding the pistons independently of any pressure increase effected by the control piston, the pressurized fluid and spring means acting upon said control piston in opposition to said braking torque which causes said control piston to be displaced, a sudden decrease in braking torque resulting from the brake shoes causing said drum to cease rotation permitting the control piston to be displaced in an opposite direction and communicate fluid pressure to said valve means to cause said valve means to close and permit the fluid pressure to be communicated only to the first chambers of said wheel cylinder housing in opposition to the outward displacement of the pistons by the pressurized fluid from the master cylinder, the fluid pressure from the control piston causing said pistons to decrease the force exerted upon the brake shoes such that the rotating drum is permitted to recommence rotation.

27. The torque sensing braking controller in accordance with claim 26, further comprising resilient means for biasing the brake shoes radially inwardly of said brake and causing said one shoe to operatively engage the control piston.

28. The torque sensing braking controller in accordance with claim 27, wherein the engagement of the brake shoes with the rotating drum causes said brake shoes to rotate and bias an end of said one brake shoe against said control piston and cause the control piston displacement, and the valve means comprising a poppet valve biased by a spring.

29. The torque sensing braking controller in accordance with claim 28, wherein the poppet valve includes a seat movable responsively to the fluid pressure, the seat moving responsively to close the poppet valve and prevent transfer of fluid between the respective first and second chambers and permit the fluid pressure to be communicated to the first chambers.

30. The torque sensing braking controller in accordance with claim 29, wherein the movable seat includes a lip seal thereabout which, when the communication of pressurized fluid from said master cylinder ceases and braking application ends, permits fluid pressure in said first chambers to flow around said lip seal.

31. A torque sensing braking controller for a disc brake operating responsively to a master cylinder, comprising a caliper, a torque support plate fixed to a vehicle and slidably supporting thereon the caliper, the caliper comprising a housing having a first bore therein receiving a differential area piston, the first bore including an enlarged bore section and the piston having an enlarged diameter portion received in the enlarged bore section such that the piston and housing define first and second chambers on opposite sides of said enlarged diameter portion, a pair of friction elements disposed on opposite sides of a rotor operatively attached to a vehicle wheel, one friction element engaged by said piston and the other friction element engaged by the caliper, a control piston disposed within a second bore within said caliper, the control piston biased by resilient means in one direction into engagment with connection means operatively connected to at least one of said friction elements, the second bore communicating with said master cylinder and with valve means disposed in a third bore within said caliper, the third bore communicating with each of said first and second chambers, the communication of pressurized fluid from said master cylinder to the first bore biasing the piston outwardly into engagement with the one friction element independently of any pressure received from said control piston and causing said friction element to engage the rotor, reaction forces causing the caliper to be displaced and cause the other friction element to engage the opposite side of the rotor in order to retard rotation thereof, braking torque causing said friction elements to be circumferentially displaced and cause the connection means to displace the control piston against the resilient means, a sudden cessation of rotation of said rotor effecting a sudden decrease in braking torque exerted against said control piston and permitting the control piston to be displaced in an opposite direction to cause the communication of an output pressure from said control piston to said valve means, the output pressure causing said valve means to close and prevent fluid transfer between said first and second chambers and permit communication of the output pressure only to said first chamber to oppose displacement of the differential area piston by the pressurized fluid from the master cylinder, the increase in pressure in the first chamber causing a reduction in braking force exerted by the differential area piston on the one friction element so that the rotor may recommence rotation.

32. The torque sensing braking controller in accordance with claim 31, wherein the valve means comprises a poppet valve disposed within said third bore and a movable seat, a predetermined level of output pressure causing said movable seat to move and the poppet valve to close to prevent the transfer of fluid between the first and second chambers and the movable seat permitting communication of the output pressure to the first chamber for an increase in pressure therein in opposition to the pressurized fluid received from the master cylinder.

33. The torque sensing braking controller in accordance with claim 32, further comprising a flexible boot seal received between said caliper and said piston in order to prevent dirt and contamination from entering therebetween.

34. The torque sensing braking controller in accordance with claim 33, wherein said movable seat includes a lip seal which permits fluid movement about said lip seal when communication of pressurized fluid from said master cylinder ceases.

35. The torque sensing braking controller in accordance with claim 33, wherein the poppet valve includes a spring which bias the poppet valve into engagement with the moveable seat.

36. The torque sensing braking controller in accordance with claim 35, further comprising a cup seal disposed about the perimeter of the enlarged diameter section of the piston so that upon the cessation of the communication of pressurized fluid from the master cylinder, the cup seal permits fluid to flow from said second chamber to said first chamber.

* * * * *